(12) United States Patent  
Fakult et al.

(10) Patent No.: US 6,288,460 B1
(45) Date of Patent: Sep. 11, 2001

(54) FLUID-COOLED, HIGH POWER SWITCHED RELUCTANCE MOTOR

(75) Inventors: Joseph P. Fakult, Willoughby Hills; Wayne A. Pengov, Chardon; Gerald A. Dissauer, Novelty, all of OH (US)

(73) Assignee: Baldor Electric Company, Fort Smith, AR (US)

( * ) Notice: Subject to any disclaimer, the term of this patent is extended or adjusted under 35 U.S.C. 154(b) by 0 days.

(21) Appl. No.: 09/432,962

(22) Filed: Nov. 3, 1999

(51) Int. Cl.$^7$ .................................................. A02K 9/00
(52) U.S. Cl. ................................ 310/52; 310/54; 310/58; 310/59; 310/179
(58) Field of Search ................................ 310/52, 53, 54, 310/57, 58, 60 A, 64, 208, 201, 179

(56) References Cited

U.S. PATENT DOCUMENTS

| | | |
|---|---|---|
| 1,291,459 | 1/1919 | Field et al. . |
| 1,370,156 | 3/1921 | Rudenberg . |
| 1,448,700 | 3/1923 | Seidner . |
| 2,328,470 | 8/1943 | Lange et al. ........................ 171/252 |
| 2,517,105 | 8/1950 | Greer ................................... 171/252 |
| 2,655,613 | 10/1953 | Wieseman ............................ 310/194 |
| 2,691,113 | 10/1954 | Ordas ................................... 310/214 |
| 2,722,616 | 11/1955 | Moses .................................... 310/54 |
| 2,727,161 | 12/1955 | Kilner et al. ............................ 310/64 |
| 2,752,515 | 6/1956 | Baudry et al. .......................... 310/55 |
| 2,760,091 | 8/1956 | Barlow .................................... 310/61 |
| 2,788,456 | 4/1957 | Fromm ..................................... 310/64 |
| 2,898,484 | 8/1959 | Krastchew ................................ 310/52 |
| 3,600,618 | 8/1971 | Nicholas et al. ....................... 310/216 |
| 3,621,315 | 11/1971 | Dalmo et al. .......................... 310/183 |
| 3,681,628 | * 8/1972 | Krastchew ............................... 310/54 |
| 4,633,114 | 12/1986 | Reynolds ............................... 310/194 |
| 5,408,152 | 4/1995 | Finnerty et al. ......................... 310/54 |
| 5,703,421 | * 12/1997 | Durkin .................................... 310/61 |
| 5,973,427 | * 10/1999 | Suzuki et al. ............................ 310/54 |

* cited by examiner

*Primary Examiner*—Elvin Enad
*Assistant Examiner*—Thanh Lam
(74) *Attorney, Agent, or Firm*—Thompson Coburn LLP

(57) ABSTRACT

A fluid-cooled switched reluctance motor, comprised of a stator having a plurality of evenly spaced, radially oriented, like stator poles that define a gap between adjacent stator poles. The stator poles have side walls that are dimensioned wherein adjacent side walls on adjacent stator poles are parallel. Windings are wound about the stator poles, adjacent windings forming a slot of uniform cross-section therebetween. A rotor element is mounted for rotation relative to the stator. The rotor has a plurality of equally spaced, radially oriented like rotor poles. An elongated cooling tube is disposed within each of the slots defined between the windings. The cooling tube has a first end and a second end, and is dimensioned to essentially fill the slot between adjacent windings. A first coolant chamber is disposed at a first end of the stator, and a second coolant chamber is disposed at a second end of the stator.

52 Claims, 13 Drawing Sheets

FLUID-COOLED, HIGH POWER SWITCHED RELUCTANCE MOTOR

FIELD OF THE INVENTION

The present invention relates to electric motors, and more particularly to a fluid-cooled, high power switched reluctance motor for use in an electric powered vehicle.

BACKGROUND OF THE INVENTION

In recent years, there have been ongoing efforts to develop electric powered vehicles. A problem with most electric-powered vehicles is that the motors are unable to develop sufficient power, under design restraints such as size, weight and electrical consumption, typically required by such vehicles.

The present invention provides a heavy-duty, high power switched reluctance motor for direct drive of an electric powered vehicle.

SUMMARY OF THE INVENTION

In accordance with the present invention, there is provided a fluid-cooled, switched reluctance ("SR") motor comprised of a stator having a plurality of evenly spaced, radially oriented like stator poles that define a gap between adjacent stator poles. The stator poles are dimensioned wherein adjacent stator poles have side walls that are parallel to each other. Windings are wound about the stator poles, adjacent windings forming a slot of uniform cross-section between adjacent stator poles. A rotor element is mounted for rotation relative to the stator. The rotor has a plurality of equally spaced, radially oriented like stator poles. An elongated cooling tube is disposed between each of the slots between the windings. The cooling tube has a first end and a second end and is essentially dimensioned to fit within the slot between the adjacent windings. A first manifold is disposed at a first end of the stator and a second manifold is disposed at a second end of the stator. The first manifold is connected to the first end of each of the cooling tubes, and the second manifold is connected to the second end of each of the cooling tubes. A cooling fluid passes through the cooling tubes between the first and second manifolds.

In accordance with another aspect of the present invention, there is provided a motor assembly comprised of a pair of side-by-side, in line motors, each of the motors being essentially identical to the other. Each motor is comprised of a stator having a plurality of evenly spaced, radially oriented, like stator poles that define a gap between adjacent stator poles. The stator poles have side walls that are dimensioned wherein adjacent side walls on adjacent stator poles are parallel. Windings are wound about the stator poles, adjacent windings forming a slot of uniform cross-section therebetween. A rotor element is mounted for rotation relative to the stator. The rotor has a plurality of equally spaced, radially oriented like rotor poles. An elongated cooling tube is disposed within each of the slots between the windings. The cooling tube has a first end and a second end, and is dimensioned to essentially fill the slot between adjacent windings. The motors are fixedly mounted to each other and the cooling tubes are connectable to a source of cooling fluid. A controller controls the operation of the motors, wherein each motor operates independently of the other.

In accordance with another aspect of the present invention, there is provided an electric vehicle, comprised of an electrical energy source, and a fluid-cooled switched reluctance motor for driving wheels on an electric vehicle. The motor is comprised of a stator having a plurality of evenly spaced, radially oriented, like stator poles that define a gap between adjacent stator poles. The stator poles have side walls dimensioned wherein adjacent side walls on adjacent stator poles are parallel. Windings are wound about the stator poles, adjacent windings forming a slot of uniform cross-section therebetween. A rotor element is mounted for rotation relative to the stator. The rotor has a plurality of equally spaced, radially oriented like rotor poles. An elongated cooling tube is disposed within each of the slots between the windings. The cooling tube has a first end and a second end, and is dimensioned to essentially fill the slot between adjacent windings. A coolant system circulates a coolant fluid through the cooling tubes of the motor. A controller controls energy transfer from the energy source to the motor.

In accordance with another aspect of the present invention, there is provided a switch reluctance motor having a stator comprised of a plurality of equally spaced, radially oriented like stator poles wherein stator gaps are formed between adjacent stator poles along the length of the stator. A conductor/cooling assembly is comprised of a pre-formed conductor formed from a single layer of insulated rectangular wire that is formed into a coil. The coil is shaped to mount onto a stator pole in mating fashion. The conductor is positioned within the stator gap, wherein adjacent conductors define an opening or slot in the stator gap. A cooling tube having a cooling passage therethrough is disposed within the stator gap between conductors on adjacent stator poles. The cooling tube has cylindrical distal ends and an intermediate section formed into a shape conforming to a shape of the opening between the adjacent conductors. The intermediate portion essentially fills the opening along the length of the stator gap.

It is an object of the present invention to provide a fluid-cooled, switched reluctance motor assembly for use in an electric powered vehicle.

It is another object of the present invention to provide a motor assembly as described above that is heavy-duty and has high power density.

Another object of the present invention is to provide a fluid-cooled, switched reluctance motor as described above for driving the wheels of an electrically powered vehicle.

Another object of the present invention is to provide a fluid-cooled, switched reluctance motor as described above for direct driving of an electrically powered vehicle.

It is another object of the present invention to provide a motor assembly as described above that is comprised of two switched reluctance motors wherein each motor is independently energizable.

These and other objects will become apparent from the following description of a preferred embodiment of the present invention taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
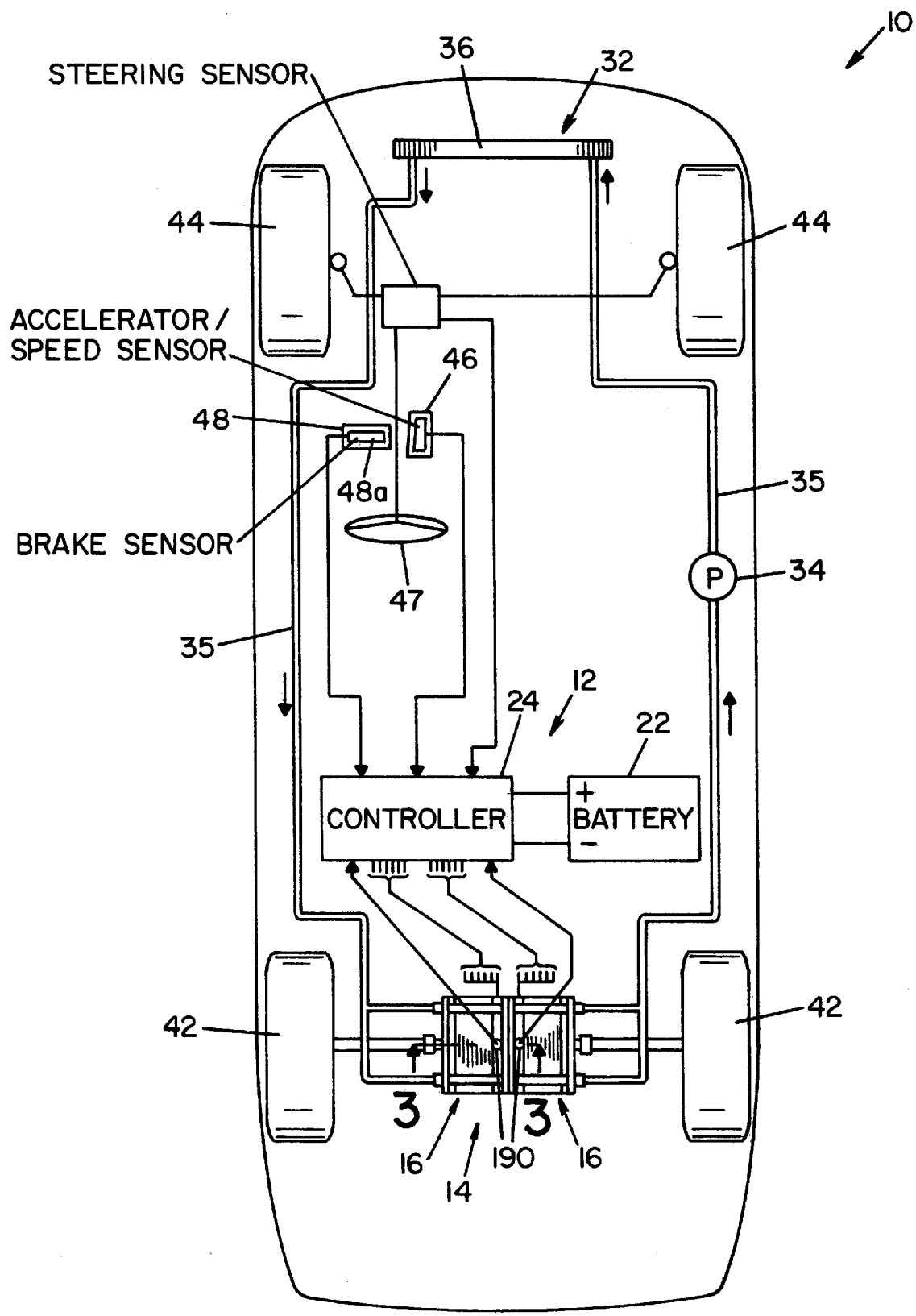
FIG. 1 is a schematic plan view of a dual traction, rear motor-drive electric vehicle illustrating a preferred embodiment of the present invention.

Referring now to the drawings wherein the showings are for the purpose of illustrating the preferred embodiment of the invention only, and not for the purpose of limiting same, FIG. 1 is a schematic view of an electric powered vehicle 10 illustrating an embodiment of the present invention. In the embodiment shown, vehicle 10 has an electrical drive system 12. The drive system 12 includes a motor assembly 14 comprised of two side-by-side, axially aligned electric motors 16. Drive system 12 includes a power source 22, such as a rechargeable battery, and a controller 24 to control operation of electric motors 16. Controller 24 is independently operable to independently energize each motor 16 of motor assembly 14. Vehicle 10 includes a coolant system 32 comprised of a pump assembly 34 for circulating a coolant fluid (not shown) through lines 35 through motor assembly 14 to cool motor assembly 14. A radiator 36 is shown in coolant system 32 to radiate from the coolant fluid heat generated by motor assembly 14. In the embodiment shown, each motor 16 of motor assembly 14 is directly connected to an associated drive wheel 42. It will, of course, be appreciated by those skilled in the art, that a differential or transmission (not shown) may be provided between the respective motors 16 and an associated drive wheel 42. Vehicle 10 also includes a pair of wheels 44 for steering vehicle 10.

Vehicle 10 includes an accelerator/speed pedal 46, a steering wheel 47 and a brake pedal 48. Accelerator/speed pedal 46 is operable to receive a signal from the operator of vehicle 10 as to a desired speed for vehicle 10 and to provide signals to controller 24 as to the desired speed. Steering wheel 47 provides an indication of the angular position of the wheels that steer vehicle 10. Brake pedal 48 provides an indication of when a mechanical braking system (not shown) on vehicle 10 has been actuated by a driver.

Motor 16

In accordance with one aspect of the present invention, motors 16 that form motor assembly 14 are essentially identical. In the embodiment shown, side-by-side motors 16 are provided to generate sufficient horsepower for a vehicle, and more particularly for a heavy-duty vehicle such as a car, truck, train, mining car or the like. In the embodiment shown, motors 16 are three phase, switched reluctance motors. As will occur to those skilled in the art from a further reading of the specification, motors 16 may be other than three phase motors without deviating from the present invention.

Since each motor 16 of motor assembly 14 is essentially identical to the other, only one shall be described in detail, it being understood that such description applies equally to the other motor 16. Broadly stated, each motor 16 is basically comprised of a stator assembly 50, a rotor assembly 100, a housing assembly 170 and a coolant assembly 210.

Stator Assembly 50

Figure 11:
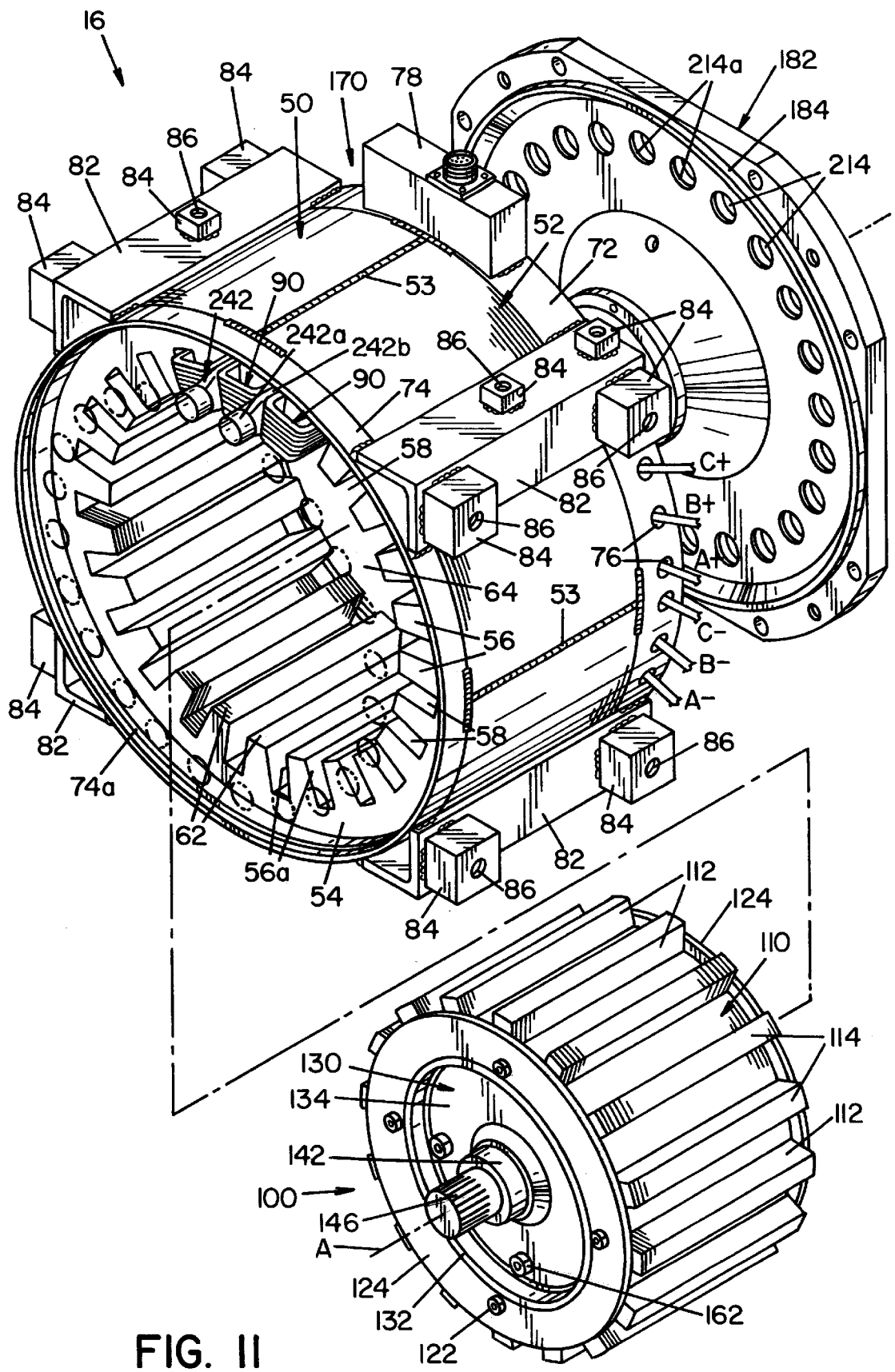
FIG. 11 is an exploded view of a stator assembly and rotor assembly, illustrating a preferred embodiment of the present invention.

Stator assembly 50 (best seen in FIG. 11) is comprised of a stack of plate laminations (not individually shown) that are formed of a ferromagnetic material. The laminations are stacked face-to-face and suitably adhered to one another to form a stator body 52 In the embodiment shown, the laminations forming stator body 52 are preferably stacked and compressed. The compressed stack of laminations is joined together by welds 53 applied axially across the outer cylindrical surface of the stack of laminations. (The laminations may also be joined by other conventionally known methods, such as by way of example and not limitation, staking, gluing, interlocking tabs and the like.) Stator body 52 thus formed is generally cylindrical in shape, having an outer cylindrical yoke portion 54 and a plurality of like, radially oriented stator poles 56. A gap 58 is defined between adjacent stator poles 56. In the embodiment shown, stator poles 56 extend radially inward from cylindrical yoke portion 54 and have inwardly facing concave stator pole faces 62. Stator pole faces 62 define a cylindrical bore or cavity 64 that is dimensioned to receive rotor assembly 100, as shall hereinafter be described. In the embodiment shown, stator body 52 has twenty-four (24) stator poles 56. Importantly, each stator pole 56 is formed to have sloping side walls, designated 56a, wherein a side wall 56a is parallel to the side wall 56a of an adjacent stator pole 56. In other words, stator poles 56 are formed (i.e., shaped) such that gaps 58 are generally rectangular with parallel sides.

First and second annular rings 72, 74 are attached to each distal end of stator body 52. Annular rings 72, 74 have an outer diameter, generally matching the outer diameter of stator body 52. In the embodiment shown, first and second annular rings 72, 74 are secured to the stator body by welding or other suitable attachment means. Each ring 72, 74 is formed to have an axially, outward facing, recessed annular surface designated 72a, 74a. First annular ring 72 includes fixed, spaced-apart apertures 76. Apertures 76 in first annular ring 72 are provided as passages to receive electrical wiring, as shall hereinafter be described. In this respect, apertures 76 (best seen in FIG. 11) are formed to receive wire mounts 78 (best seen in FIG. 3).

Stiffening members 82 extend across outer surface of stator body 52 and annular rings 72, 74. In the embodiment shown, stiffening members 82 are comprised of conventional angle iron, and are welded across stator body 52 and annular rings 72, 74 to secure and stiffen stator assembly 50. In the embodiment shown, four axially extending stiffening members 82 are symmetrically disposed about the periphery of stator body 52. Mounting blocks 84 are fixedly secured to stiffening members 82. In the embodiment shown, mounting blocks are metal and are welded to the angle iron forming stiffening members 82. Mounting blocks 84 are provided for mounting motor 16 to a support structure (not shown), and to this end each mounting block includes bores 86 formed therethrough to receive conventional fasteners (not shown).

Figure 9:
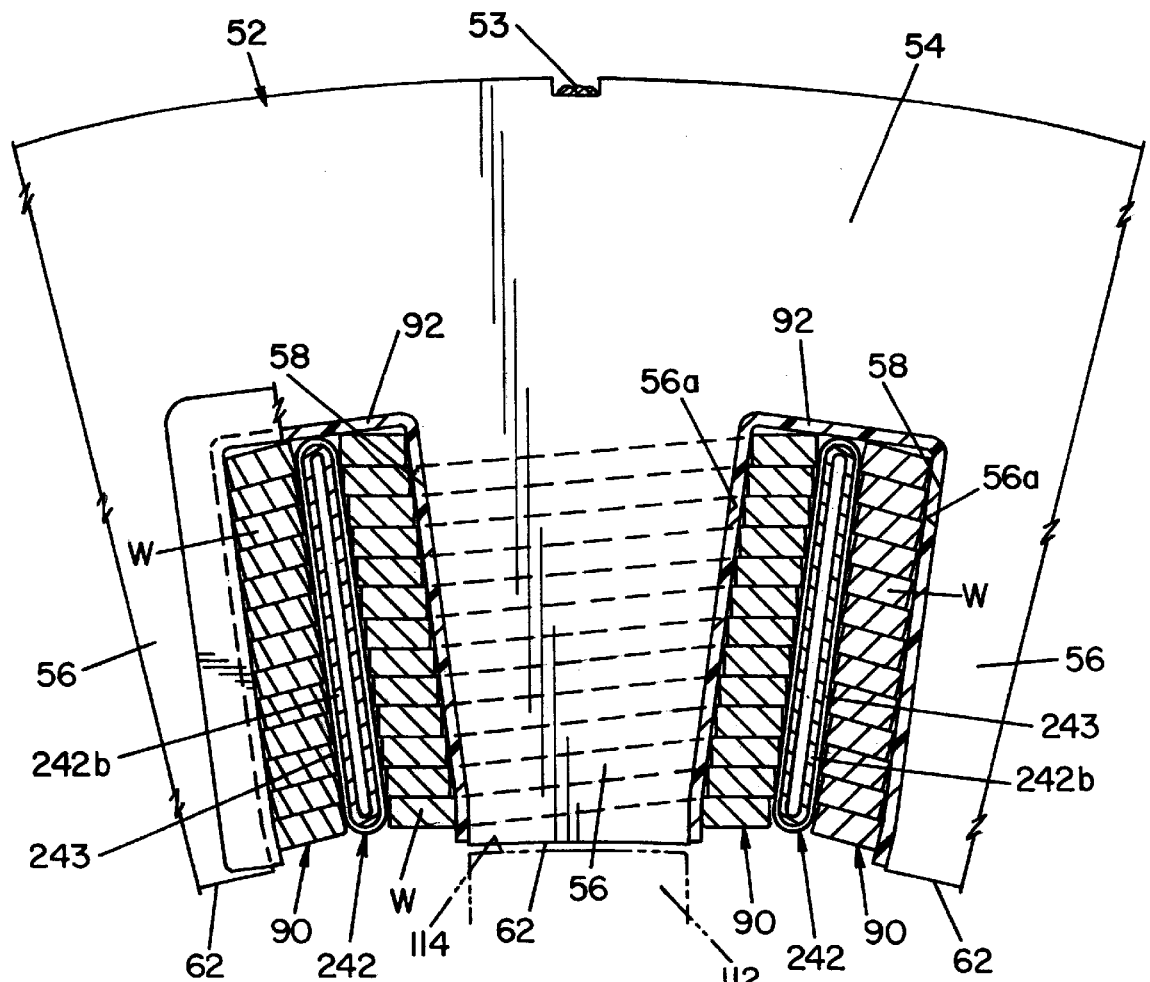
FIG. 9 is a still further enlarged sectional view of a stator and conductors shown in FIG. 8.
Figure 10:
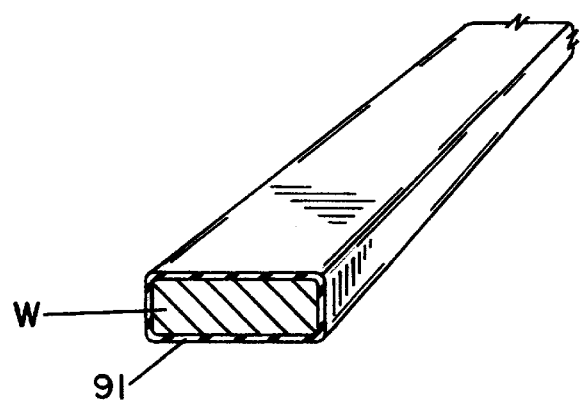
FIG. 10 is a sectioned, perspective view of a wire used in forming a conductor.
Figure 12:
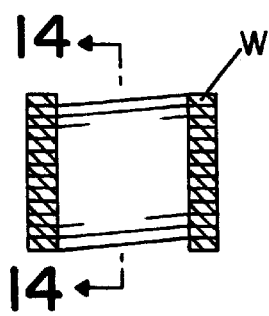
FIG. 12 is an enlarged, detached, transverse cross-sectional view showing a stack of pre-formed coils.
Figure 13:
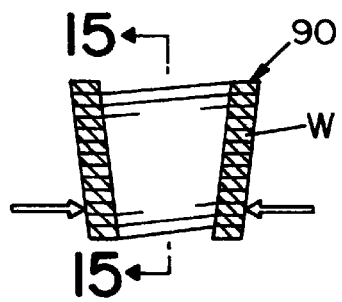
FIG. 13 is a view similar to FIG. 12 showing the coils having been formed into a conductor according to the present invention.
Figure 14:
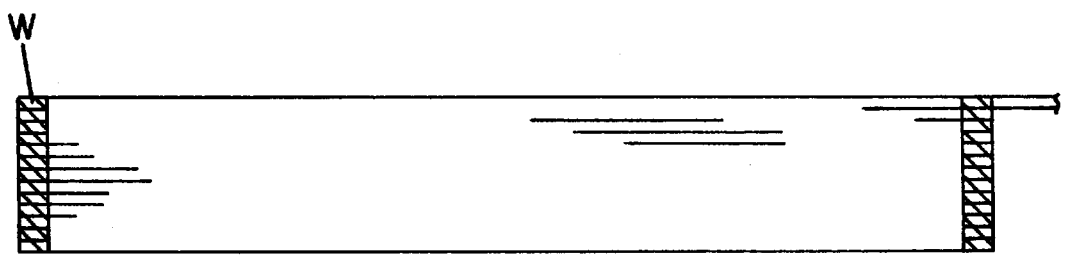
FIG. 14 is a sectional view taken along lines 14—14 of FIG. 12.
Figure 15:
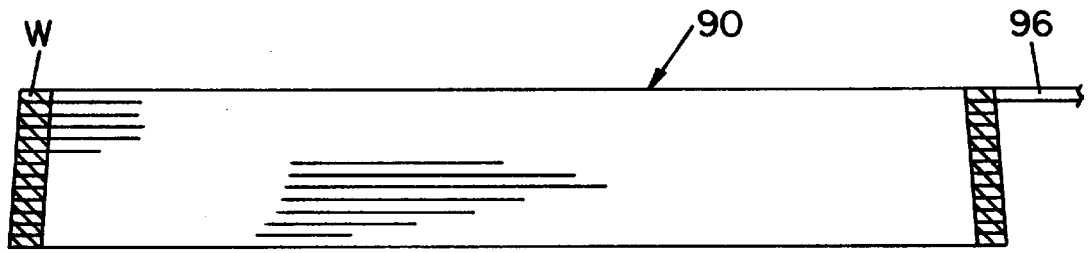
FIG. 15 is a sectional view taken along lines 15—15 of FIG. 13.
Figure 16:
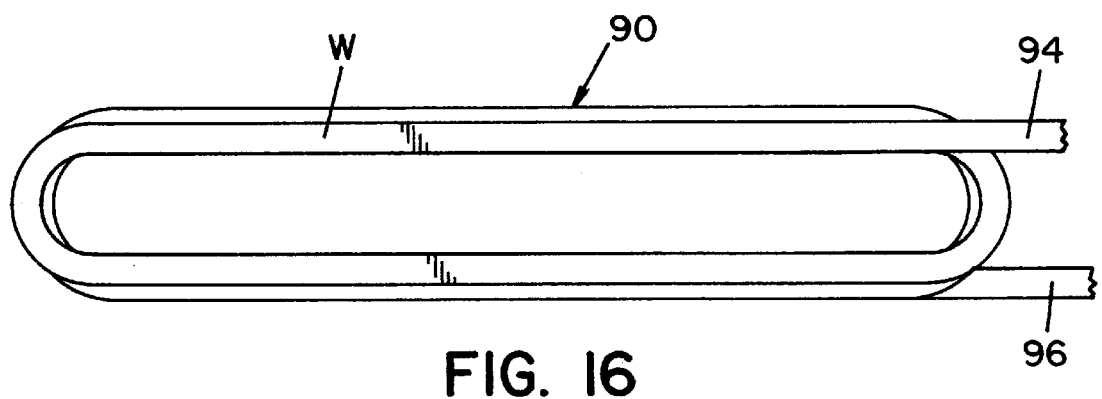
FIG. 16 is a bottom plan view of the conductor shown in FIG. 15.

Electrical conductors 90 are disposed about each stator pole 56. Each conductor 90 is comprised of a rectangular wire W having a thin coating 91 of insulation thereon. As used herein, "rectangular" is intended to define wire having a square cross-section and wire having a non-square cross-section. In the embodiment shown, a rectangular wire W having a non-square cross-section (best seen in FIG. 10) is used, and wire W is wrapped edge-wise relative to a respective stator pole 56 into a single layer winding. The rectangular wire W of non-square cross-section is used to provide more copper to each conductor 90. Conductors 90 are preferably pre-formed to be mounted individually onto each stator pole 56 of stator body 52. Because stator poles 56 have a trapezoidal shape, each pre-formed conductor 90 is formed to have a complimentary shape such that each conductor 90 may be placed over an associated stator pole 56 in mating fashion, as best seen in FIG. 9, so as to maximize the copper surrounding each stator pole 56. The formation of a conductor 90 is schematically illustrated in FIGS. 12–16. Each pre-formed conductor 90 is formed by wrapping an insulated, rectangular copper wire W around a mandrel (not shown). The mandrel has parallel sides so as to form initially a wire coil with parallel sides, as illustrated in FIGS. 12 and 14. The sides of this initial copper wire coil are pressed inward (as illustrated in FIGS. 13, 15 and 16) to form the sloping sides of conductor 90 to match the sloping sides of a stator pole 56. As will be appreciated, the tapering of the side walls of the copper coils causes the distal ends of the coil to flare outwardly, as best seen in FIG. 16.

Prior to placing conductor 90 onto a stator pole 56, a channel-shaped liner 92 is placed into gap 58 to insure electrical isolation between each conductor 90 and an associated stator pole 56. Liner 92 is typically formed of an insulating material, such as a paper or a plastic material, as is conventionally known. (In place of liner 92, a powder coating (not shown) may be applied to stator 52 to coat gaps 58 defined between stator poles 56.) Each pre-formed conductor 90 includes positive and negative electrical leads 94, 96 extending to one end thereof. A conductor 90 is placed over an associated stator pole 56 with positive and negative electrical leads 94, 96 of conductor 90 extending toward the open end of the stator body 52 defined by the first annular ring 72. Every third conductor is connected in series to define one of the three motor phases. In the embodiment shown, a three-phase motor having phases designated Phase A, Phase B and Phase C is created. Each motor phase includes eight (8) stator poles 56. In the embodiment shown, each stator pole 56 of one of the motor phases is separated from a stator pole 56 of the same phase by 45 angular degrees. Stated another way, a stator pole 56 of one phase is disposed between a stator pole 56 of a second phase and a stator pole 56 of a third phase. Positive and negative leads of each phase extend through the six apertures 76 in the first annular ring 72. Wire mounts are preferably provided to capture these leads and to form a seal around the leads.

Figure 8:
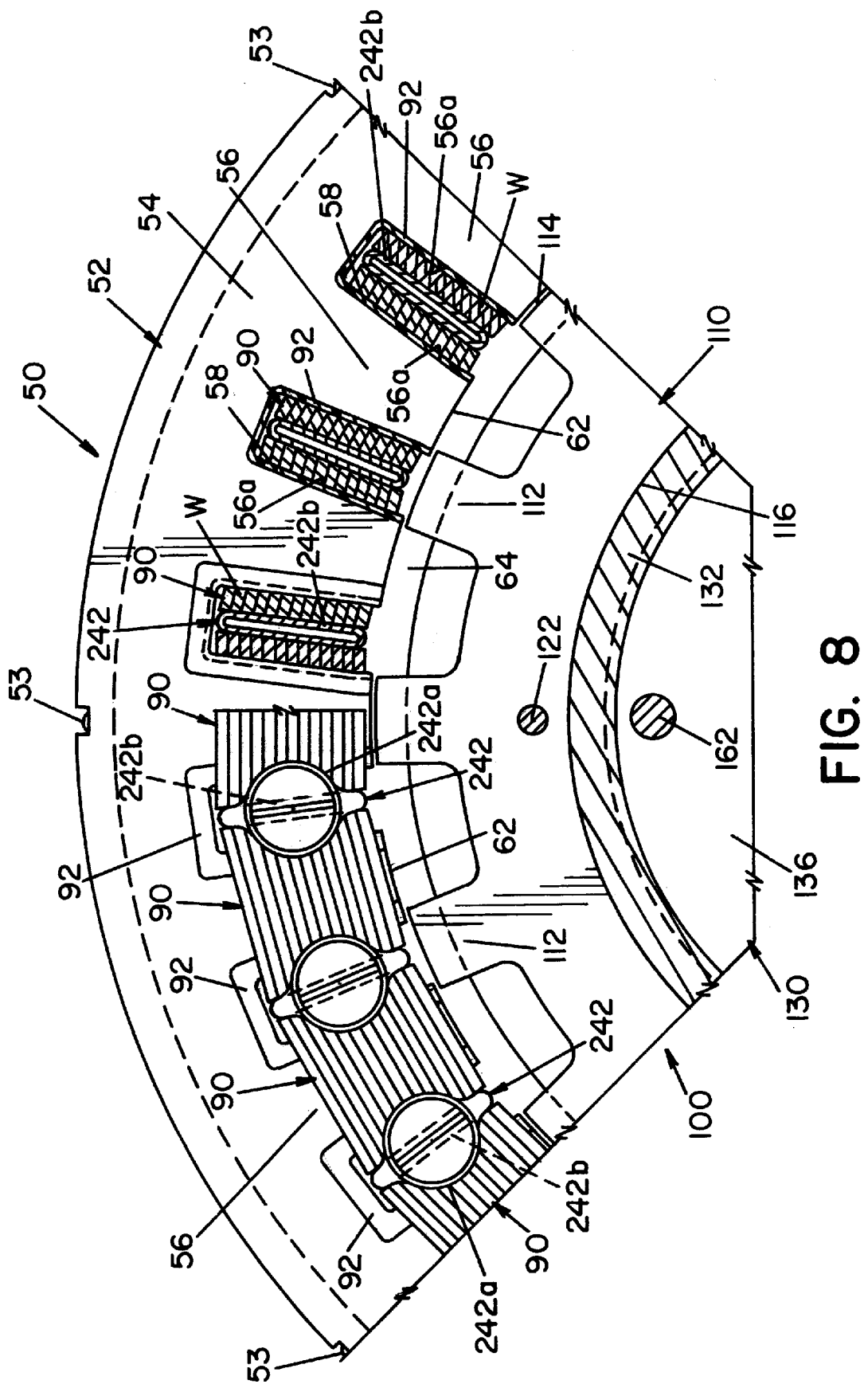
FIG. 8 is a further enlarged, partially sectioned end view of a portion of FIG. 7.

As best seen in FIGS. 8 and 9, conductors 90 are dimensioned such that when positioned on adjacent stator poles 56, an axially extending, thin gap of generally rectangular cross-section is formed between adjacent conductors 90.

Rotor Assembly 100

Rotor assembly 100 is adapted to be disposed within central bore 64 defined by stator pole faces 62. Rotor assembly 100 is comprised of a rotor body 110 and a shaft section 130. Like stator body 52, rotor body 110 is comprised of a stack of like, plate laminations (not shown) that are formed of a ferromagnetic material. In the embodiment shown, each lamination includes sixteen (16) equally spaced, radially oriented like rotor poles 112. Rotor poles 112 extend radially outward and each has an outward facing, convex rotor pole face 114. Each lamination includes a centrally located circular opening 116. Four smaller apertures 118 are angularly spaced about opening 116. A stack of rotor laminations, approximately equal to the number of laminations forming stator body 52 is pressed together and joined to form rotor body 110. In the embodiment shown, the plurality of rotor laminations are joined together by conventional fasteners (bolts) 122 that extend through apertures formed in the laminations. (As with stator body 52, the laminations forming rotor body 110 may be joined by other conventionally known methods.) End rings 124 having a diameter greater than the diameter of circular opening 116, but smaller than the outer diameter of rotor body 110, are used to compress the rotor laminations. Rotor body 110 is dimensioned such that rotor pole faces 114 define an outer diameter closely matching the diameter of bore 64 defined by stator pole faces 62. In this respect, the outer diameter of rotor body 110 is only slightly less than the diameter of bore 64 defined by stator pole faces 62.

Shaft section 130 is comprised of a cylindrical, tubular member 132, a first end cap 134 and a second end cap 136. Tubular member 132 is cylindrical in shape. Each end of tubular member 132 is counterbored to define an outward facing, recessed, annular surface designated 132a, at each end thereof. Tubular member 132 is preferably formed of a metal having low magnetic permeability, such as stainless steel to reduce eddy current and hysteresis losses during operation of motor 16. First end plate 134 and second end plate 136 are circular and have an outer diameter such that they fit within tubular member 132 and rest upon the outward facing, annular surfaces 132a. First end plate 134 includes an outwardly extending shank portion 142 having a cylindrical bearing surface and a splined end portion 146. The second end plate 136 also includes an outward extending cylindrical shank portion 152 having an outer cylindrical surface. The first and second end caps 134, 136 are designed to be fastened to tubular member 132 by elongated bolts 162 that extend through apertures in the plate members 134, 136.

Rotor body 110 is adapted to be mounted onto shaft section 130. Specifically, rotor body 110 is dimensioned to be heat-shrunk onto shaft section 130. In this respect, rotor body 110 is heated to enlarge the inner bore defined thereby. Rotor body 110 is heated until the inner bore is larger than the outer diameter of tubular member 132 of shaft section 130. Rotor body 110 is then slid onto shaft section 130 and allowed to cool, wherein rotor body 110 shrinks onto shaft section 130 in a conventionally understood fashion.

Housing Assembly 170

Stator assembly 50 and rotor assembly 100 are mounted relative to each other by means of housing assembly 170. In the embodiment shown, the housing assembly 170 is comprised of a first end plate 172 and a second end plate 182. Each end plate 172, 182 is cylindrical in shape and is dimensioned to be attached respectively to first and second annular rings 72, 74 of stator assembly 50. First end plate 172 includes an annular, recessed shoulder 174 dimensioned to matingly engage recessed, annular surface 74a of second annular ring 74. First plate 172 includes a centrally located bore 176 that defines a cylindrical surface 176a that is dimensioned to receive a conventional roller bearing 178. Bearing 178 is disposed within first end plate 172 to receive shank portion 142 of rotor assembly 100 (best seen in FIG. 3), so as to centrally align rotor assembly 100 along a central axis designated "A" through stator body 50.

Figure 3:
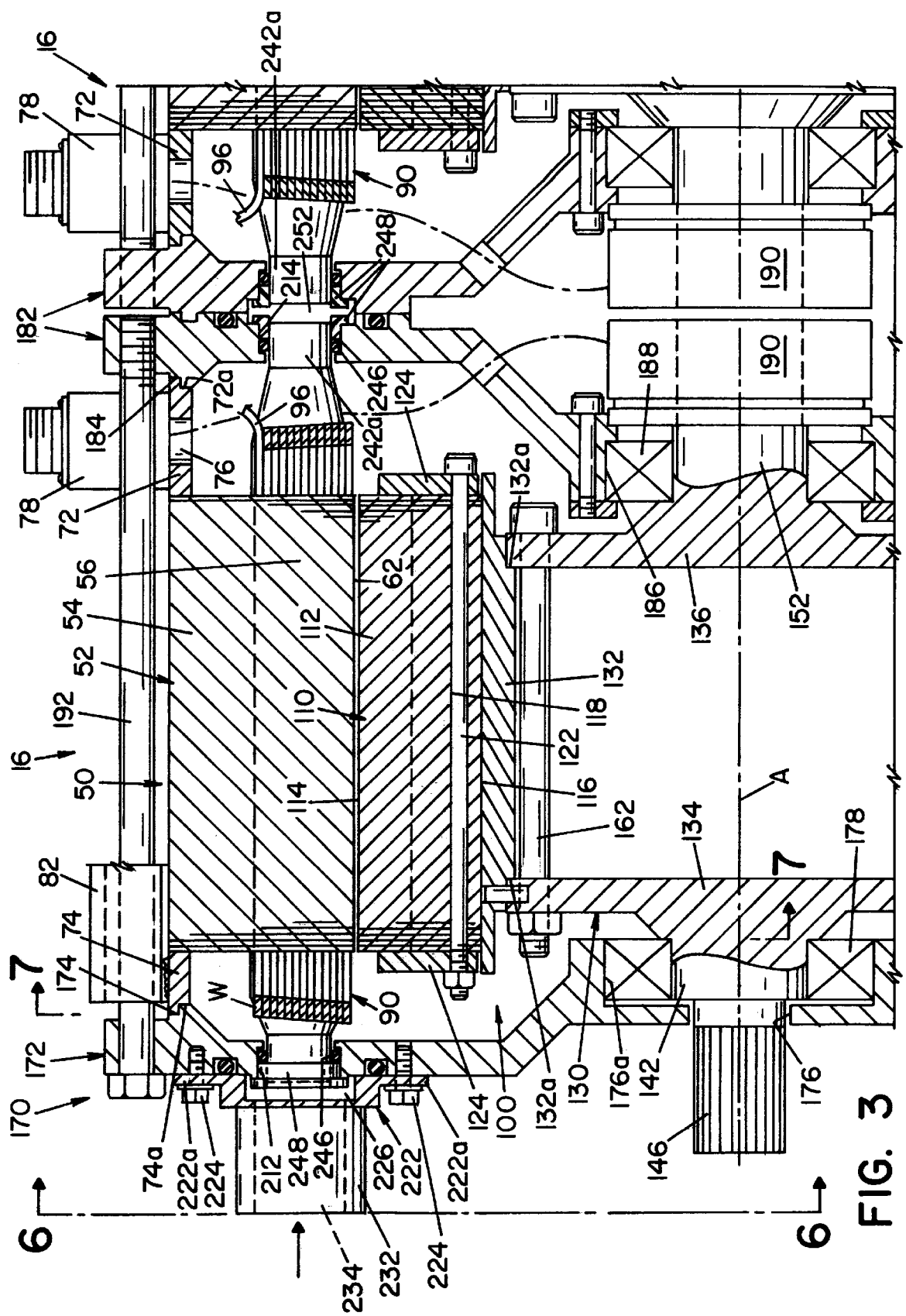
FIG. 3 is an enlarged sectional view taken along lines 3—3 of FIG. 1 and FIG. 7.

Second end plate 182 is similar in many respects to the first end plate 172 and includes an outer annular shoulder 184 that is dimensioned to matingly engage the recessed annular surface 72a of first annular ring 72 of stator body 52. Second end plate 182 includes a centrally located bore 186. Bore 186 is dimensioned to receive a roller bearing 188. Bearing 188 is adapted to receive cylindrical shank portion 152 of rotor assembly 100 (as best seen in FIG. 3). A portion of shank portion 152 is dimensioned to extend through end plate 182. An encoder 190 mounted on end plate 182 is provided to monitor the relative position of rotor assembly 100 relative to stator assembly 50. Roller bearings 178, 188 in first and second end plates 172, 182 are axially aligned and disposed to receive, respectively, bearing surfaces 142, 152 of rotor assembly 100 so as to position the rotor assembly 100 within bore 64 defined by stator pole faces 62.

Figure 4:
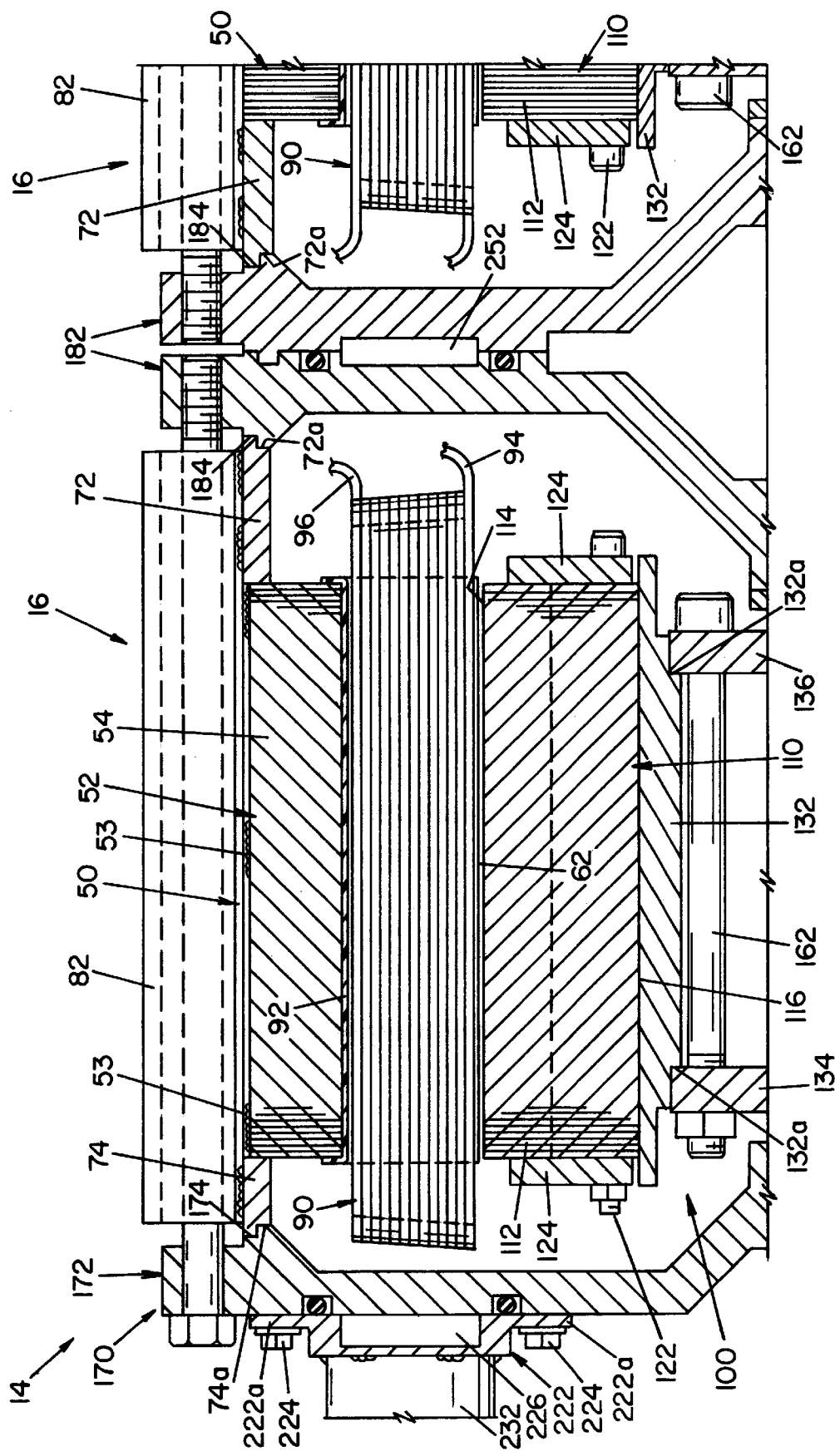
FIG. 4 is an enlarged sectional view taken along lines 4—4 of FIG. 7.

As best seen in FIG. 4, end plates 172, 182 are dimensioned such that an outer annular portion of each extends beyond the outer surface of stator body 52. In this respect, first and second end plates 172, 182 are secured to stator body 52 by elongated, threaded fasteners 192 that extend through openings in first end plate 172 into threaded openings formed in second end plate 182, as best seen in FIG. 3.

Cooling System 210

Figure 5:
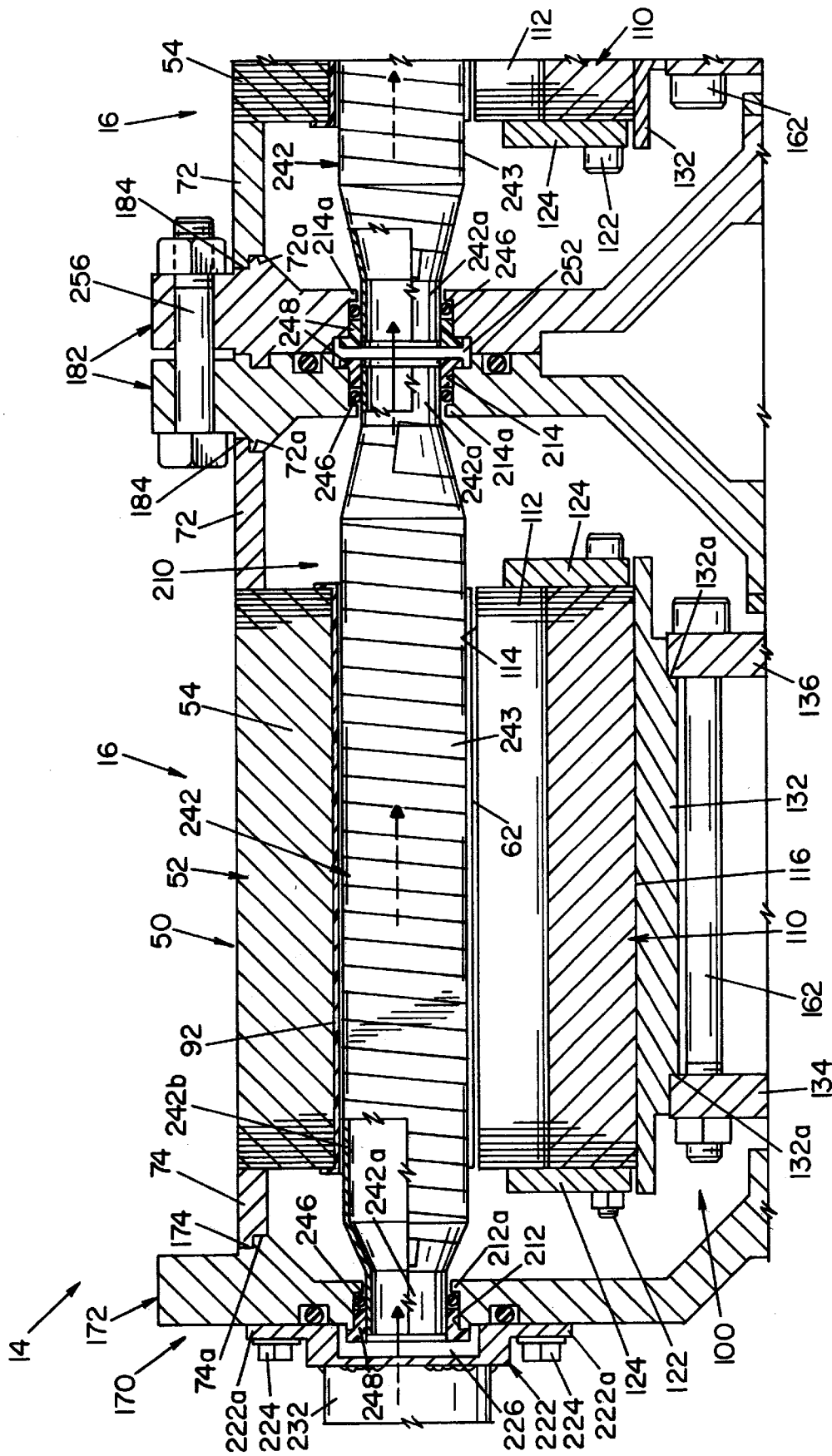
FIG. 5 is an enlarged sectional view taken along lines 5—5 of FIG. 7.
Figure 6:
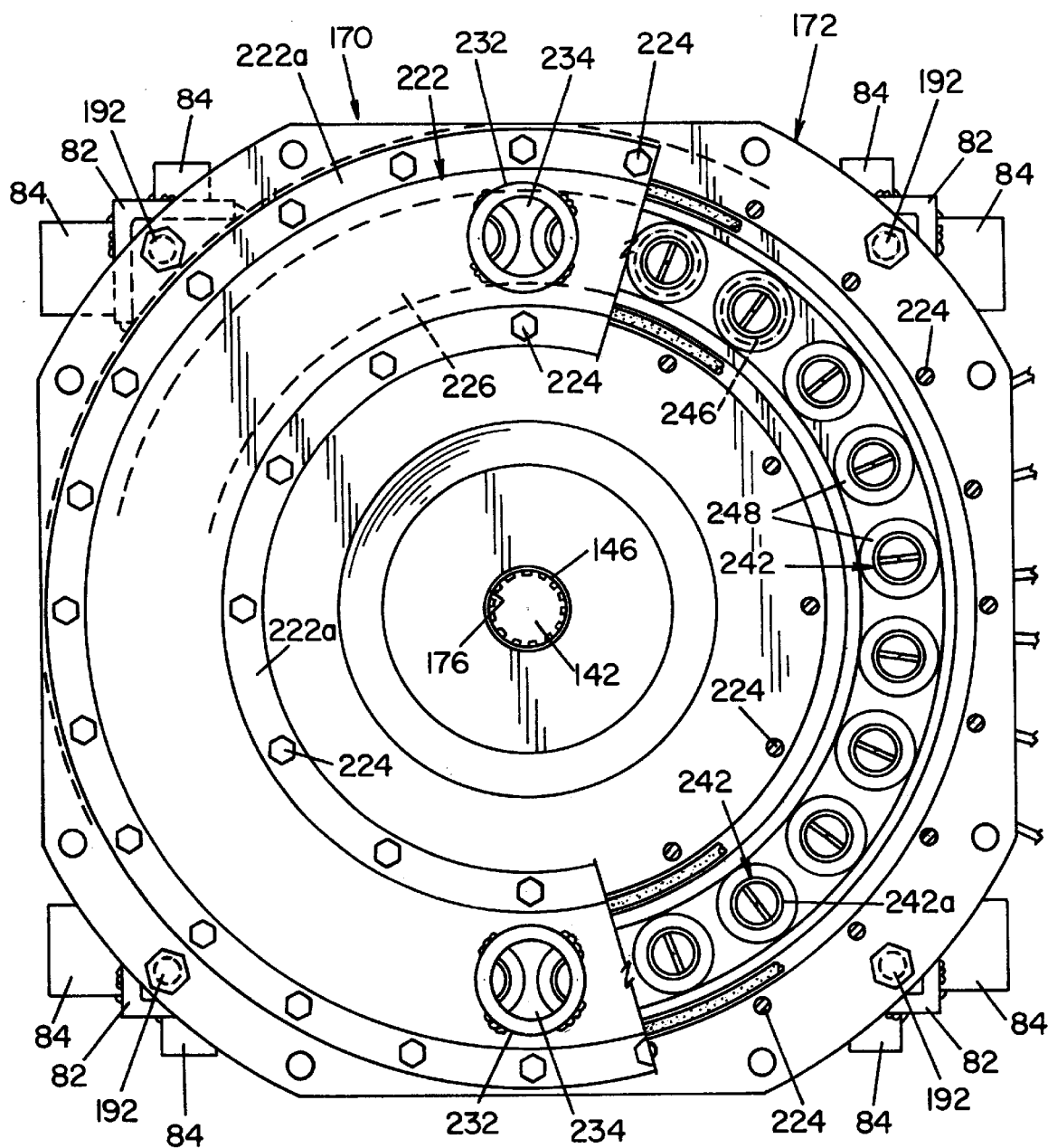
FIG. 6 is a partially broken, end view taken along lines 6—6 of FIG. 3.
Figure 7:
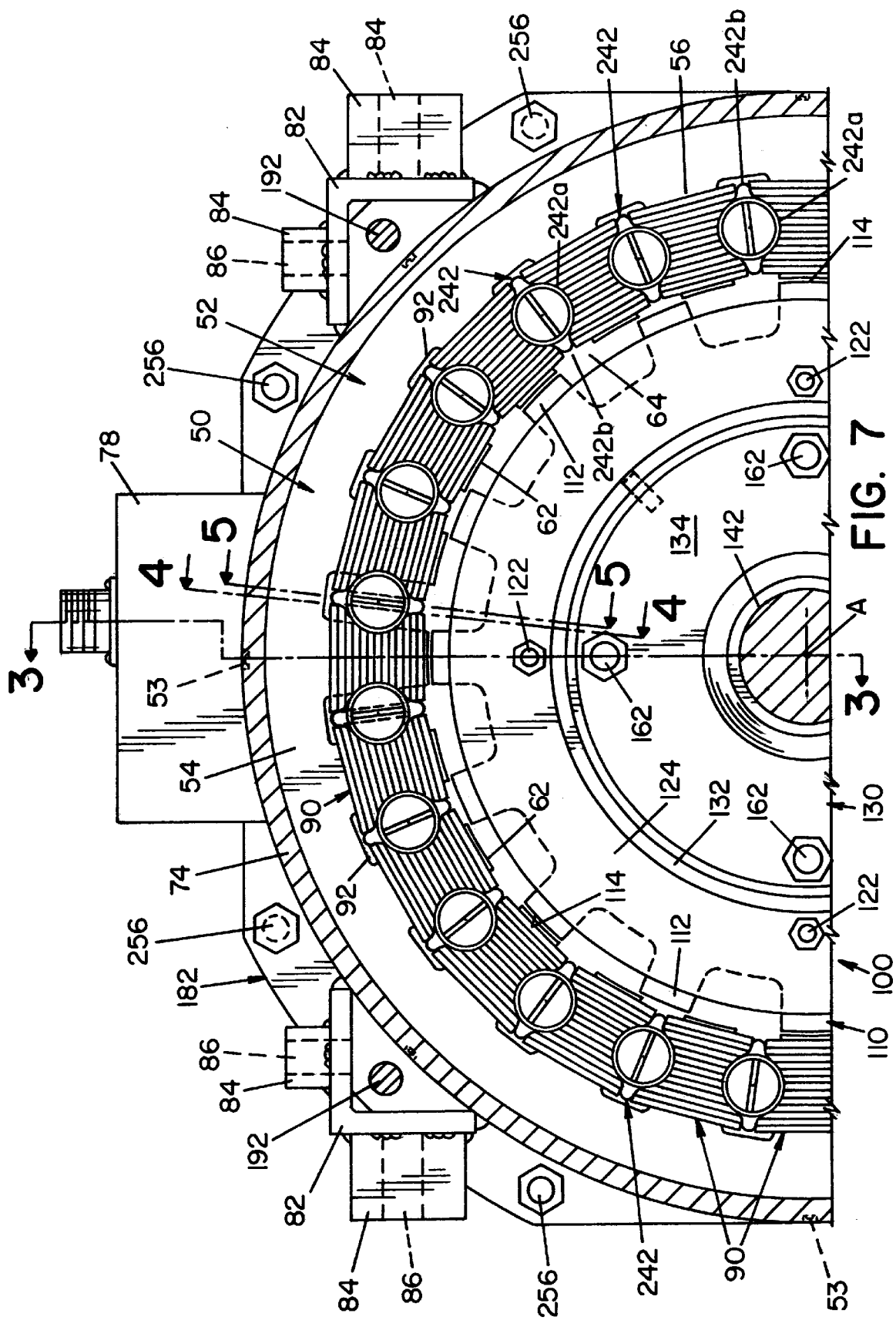
FIG. 7 is a sectional view taken along lines 7—7 of FIG. 3.

To dissipate heat from stator assembly 50, cooling system 210 is provided. First end plate 172 and second end plate 182 form part of cooling system 210. In this respect, a plurality of angularly spaced, radially located coolant apertures 212, 214 are provided through first end plate 172 and second end plate 182, respectively. Apertures 212, 214 are located so as to be in alignment with each other and to be aligned with gaps 58 defined by stator poles 56 of stator housing 52. As best seen in FIGS. 3 and 5, each aperture 212, 214 is counterbored to define a shoulder or flange designated 212a, 214a respectively. An annular manifold 222 is dimensioned to be mounted onto first end plate 172. Manifold 222 has an outwardly extending flange 222a. Conventional fastener 224 extends through flange 222a into threaded openings (not shown) formed in the end plate 172. Manifold 222 and first end plate 172 defines an annular coolant cavity 226. Coolant cavity 226 communicates with each coolant aperture 212 in first end plate 172. A nipple 232 is mounted to manifold 222. Nipple 232 defines a cylindrical opening 234 that communicates with coolant cavity 226. Nipple 232 is connectable by lines 35 of coolant system 32 to receive coolant fluid therefrom.

Figure 17:
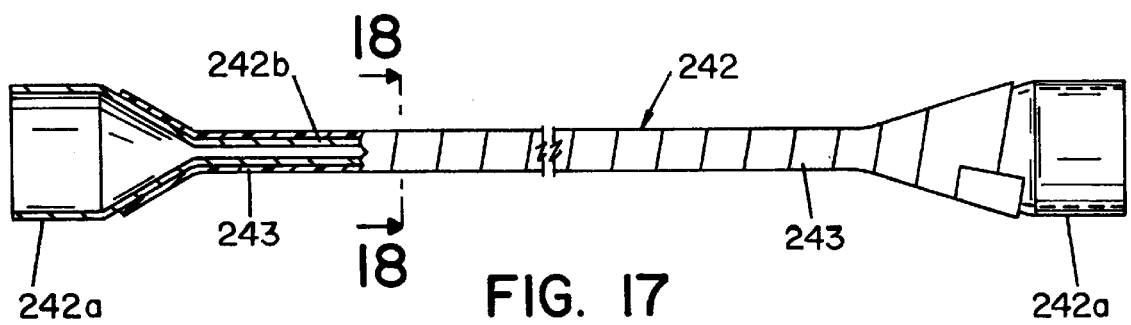
FIG. 17 is an enlarged, partially sectioned, detached plan view of a cooling tube.
Figure 18:
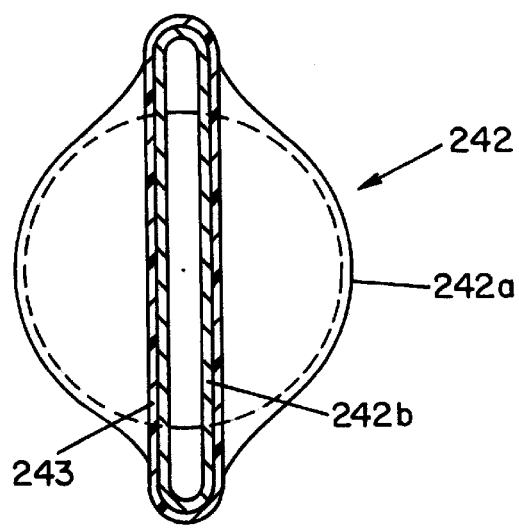
FIG. 18 is a sectional view taken along lines 18—18 of FIG. 17.
Figure 19:
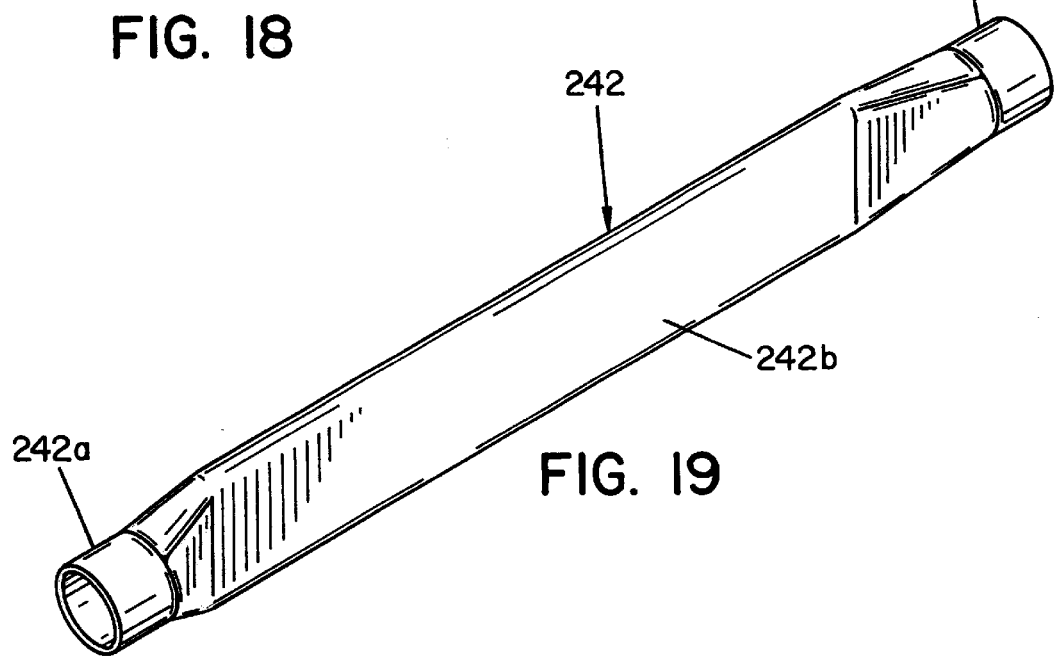
FIG. 19 is a perspective view of a coil cooling tube.

A cooling tube 242 is disposed within the slot or gap defined between adjacent conductors 90 (as best illustrated in FIGS. 5 and 8). In accordance with one aspect of the present invention, cooling tube 242 has cylindrical end portions 242a and an elongated intermediate portion 242b having a generally flat, rectangular cross-section. Cooling tubes 242 are preferably formed of a non-magnetic metal as an integral, single piece. In the embodiment shown (best seen in FIGS. 17–19), each cooling tube 242 is formed from a thin wall, stainless steel cylindrical tube that is flattened in the middle to form an intermediate section 242b having parallel side walls. In the embodiment shown, an insulating tape 243 is wrapped around intermediate section 242b of cooling tube 242 to insure electrical isolation from conductors 90. A powder coating (not shown) could be applied to intermediate section 242b instead of tape 243 to insulate the same. On information and belief, a uniform powder coating may provide a better thermal path to conductors 90, thereby providing more effective cooling. Intermediate section 242b of cooling tube 242 is dimensioned so as to fit snuggly within the slot or gap defined between adjacent conductors 90, preferably with the surface cooling tube 242 as close as possible to the surface of conductor 90. More preferably, insulating layer 243 of cooling tube 242 is in contact with the insulating coating on wire W of conductor 90 to provide a maximum heat transfer from conductor(s) 90. Any void or space between a cooling tube 242 and an adjacent conductor 90 is preferably filled with a thermally conductive material (not shown).

Cooling tubes 242 have axial lengths wherein the cylindrical end portions 242a project into apertures 212, 214 in first end plate 172, and second end plate 182, as best seen in FIG. 5. Cylindrical end portions 242a of coolant tubes 242 are closely dimensioned to fit through the openings defined by shoulder portions 212a, 214a of apertures 212, 214. A fluid-tight seal is formed between cylindrical end portion 242a of tubular members 242 and first end plate 172 and second end plate 182. As indicated above, apertures 212, 214, through first and second end plates 172, 182, are counterbored to define annular shoulders 212a, 214a. The counterbore produces an annular gap or space between the inner cylindrical surface of apertures 212, 214 and the outer cylindrical surfaces of cylindrical end portion 242a. An O-ring 246, formed of a resilient, elastomeric material, is disposed in this annular gap between the outer surface of the cylindrical end portion 242a and the inner surfaces of the counterbored section of apertures 212, 214. O-ring 246 forms a seal between the cylindrical end portion 242a of the cooling tube 242 and the respective end plate 172 or 182. O-ring 246 is held in place by a cylindrical bushing 248. Bushing 248 is preferably formed of a plastic material that is dimensioned to be press-fit into aperture 212 or 214 around cylindrical end portion 242a of cooling tube 242. Cylindrical end portion 242a of each cooling tube 242 is attached to its respective end plate 172 or 182 in a similar fashion, thereby forming a fluid-tight seal. In this arrangement, the interior passage of each cooling tube 242 communicates with coolant cavity 226 defined between manifold 222 and first end plate 172.

In like fashion, a manifold 222 could be attached to end plate 182 to define a coolant chamber where cylindrical end portions 242a of cooling tube 242 project through end plate 182, but in the embodiment shown in FIG. 1, side-by-side, axially-aligned motors 16 are provided. In this configuration, second end plate 182 of each respective motor 16 are joined together by fasteners 256 (best seen in FIG. 5) wherein second end plates 182 of the respective motors 16 form an annular coolant cavity 252 between second end plates 182. As best seen in FIG. 5, the respective end portions 242a of cooling tubes 242 communicate with coolant cavity 252 and are in axially alignment with each other, wherein a coolant fluid flowing from one cooling tube 242 is directed into coolant cavity 252 and into other cooling tube 242. The present invention thus provides a cooling system 210 wherein each cooling tube 242 between stator poles 56 is connected at each end to a coolant cavity 226, 252 such that a coolant fluid is conveyed through the cooling tubes 242 between the respective coolant cavities 226, 252 to dissipate heat from stator assembly 50.

Operation

Aspects of the present invention shall now be described in greater detail through a discussion of the operation of motors 16 of motor assembly 14. The speed and direction (as well as whether a motors 16 are "motoring" or "braking") is determined by the timing and sequence of the energization of phases A, B and C by controller 24. During each phase energization, conductors 90 of a particular phase are energized. As indicated above, each conductor 90 is pre-formed of a wire of rectangular cross-section, wherein the wire is formed in a single layer to have an edge-wise wrap around an associated stator pole. Pre-formed conductors 90 are shaped to match the outer profile of stator pole 56, and to fit thereon. This configuration provides certain advantages with respect to the power output of motors 16. Specifically, use of rectangular wire allows maximum copper packing in the space between adjacent stator poles 56, each loop or turn of the wire being in contact with the loop or turn of the wire immediately above or below. Each turn or loop is separated only by the coating of insulation on the wire. In this respect, the rectangular wire further reduces air gaps or voids (as contrasted to cylindrical wire), and creates a shape wherein each coil or turn of a conductor 90 may be brought into direct contact with its respective cooling tube 242 to help dissipate heat evenly, as shall be described in greater detail below. Another advantage of a single layer winding is a very small turn-to-turn voltage difference that reduces the likelihood of turn-to-turn electrical shorts. In other words, the use of single-layer coils insures even heat dissipation and increases insulation reliability since the heat is transferred in a single wire to a cooling tube 242, and does not need to traverse multiple layers of wires as in a multiple layer winding. Further, the shape of conductors 90 and stator poles 56 defines a uniform, rectangular gap between adjacent conductors 90 that receives intermediate portion 242b of cooling tubes 242 therein. The overall effect of the single layer, rectangular-wire, conductor 90, and cooling tube 242 being adjacent thereto, is to maximize the copper fill in gaps 58 and at the same time increase cooling to conductors 90, thereby enabling high power output per motor volume.

With respect to the cooling of motors 16, in the embodiment shown, a coolant fluid in coolant system 32 is forced by pump assembly 36 into coolant cavity 226 at one end of motor assembly 14. A conventional liquid coolant is used, it being appreciated that a gas fluid may also be used. From coolant cavity 226, the coolant fluid flows through each cooling tube 242. Because the coolant fluid flows through all of the cooling tubes 242 in parallel, the flow rate of coolant through each individual cooling tube 242 is very low. Thus, the pressure drop across the entire coolant system 32 is reduced, thus requiring less fluid-pumping power to circulate the coolant fluid. The coolant fluid exits cooling tubes 242 into coolant cavity 252 defined between the two, second end plates 182 of the two adjacent motors 16. From coolant cavity 252, the coolant fluid is forced through cooling tubes 242 of the second motor 16 into coolant cavity 226 of the second motor 16. From here, the coolant fluid is returned to radiator 36 by lines 35. As will be appreciated, although the present embodiment discloses one directional coolant flow through both motors, coolant system 32 may be revised wherein a stream of coolant fluid flows into coolant cavity 226 of each motor 16 and flows through cooling tubes 242 to coolant cavity 252 from where it is returned to radiator 36, or vice versa. Still further, cylindrical end portions 242a of cooling tube 242 allow for relatively easy sealing through the use of conventional O-rings in relatively easily-machined cylindrical openings.

Referring now to the operation of vehicle 10, controller 24 is programmed to be able to adjust the relative speeds of the respective motors 16 during operation of vehicle 10. Specifically, controller 24 may cause one drive wheel 42 to rotate faster than the other drive wheel 42 to enhance the operating capability of vehicle 10. For example, when the driver of vehicle 10 initiates a turn by turning steering wheel 47, a sensor associated with steering wheel 47 may provide continuous signals to controller 24 as to the extent of the turn (i.e., the turning radius) as well as the severity of the turn (i.e., whether the change in the turning radius is gradual or whether it is a severe change as in an emergency turn.) Based upon the existing speed of vehicle 10, the turning radius and/or rate of change of the turning radius, controller 24 may adjust the respective speeds of an inner drive wheel 42 and an outer drive wheel 42 to maintain a consistent, center line speed of vehicle 10. The operation of controller 24 is thus capable of providing an "electronic differential" for independent operation of each drive wheel 42.

Through programming of controller 24, it is also possible to control motor(s) 16 to effect electronic braking of drive wheels 42. The braking of drive wheels 42 that shall hereinafter be described is independent of any mechanical braking system on vehicle 10. As is known by those skilled in the art, a braking effect can be produced on a rotating rotor if aligned stator and rotor poles are separating as a result of the rotor rotation while a magnetic flux path still exists in the stator poles. This characteristic of a switched reluctance motor enables controller 24 to adjust the timing of phase energization to produce a braking effect on one or both motors 16, thereby effectively braking (slowing rotation) of drive wheels 42, independently of any mechanical brake system on vehicle 10. Initiation of braking by controller 24 may be the result of controller 24 sensing an indication of a braking signal from brake sensor 48a (initiated by the driver), or may be based upon controller 24 determining the need to brake rotation of one or both drive wheels 42 to adjust the relative velocity of the drive wheels 42 as a result of a turn initiated by the driver. As will be appreciated, controller 24 may also completely cease phase energization to motor 16 to allow a mechanical braking system (not shown) to slow rotation of drive wheels 42 and/or the wheels that steer vehicle 10.

As will be appreciated, controller 24 may be programmed so as to be capable of simultaneous operations and control of the foregoing modes so as to be able to accelerate, decelerate, motor or brake one or both motors during operation of vehicle 10 so as to react to the ever-changing driving situations taken by vehicle 10. The ability to electronically control the motoring or braking of each motor 16 enables a number of different operating modes which are believed to be desirable in an electronic passenger vehicle.

The present invention thus provides a heavy-duty, fluid-cooled switched reluctance motor having a relatively high power density (i.e., high power output in a relatively small package) because of the configuration of conductors 90 and the ability of cooling tubes 242 to dissipate heat therefrom. The foregoing advantages are created, in part, as a result of the simple configuration of cooling tubes 242, as well as the seal arrangement that seals cooling tubes 242 to first and second end plates 172, 182. The present invention thus provides an efficient, fluid-cooled switched reluctance motor that provides high motor output in a relatively small package. The high efficiency of motor 16 is believed to be due in part to the shape of stator poles 56, as well as the single layer of conductors 90 being formed of rectangular wire. The trapezoidal shape of stator poles 56 and the rectangular wire increase the "copper fill" in gaps 58 between adjacent stator poles 56. Further, cooling tubes 242 adjacent to conductors 90, provides significant cooling of conductors 90. This cooling results in less resistance in conductors 90. The single layer of copper wire W further facilitates cooling by avoiding multiple layers of copper wherein heat conducted from inner layers must migrate through insulated boundaries between the layers. These and other elements of motor 16 are believed to provide a compact, high power switched reluctance motor for heavy-duty use.

Figure 2:
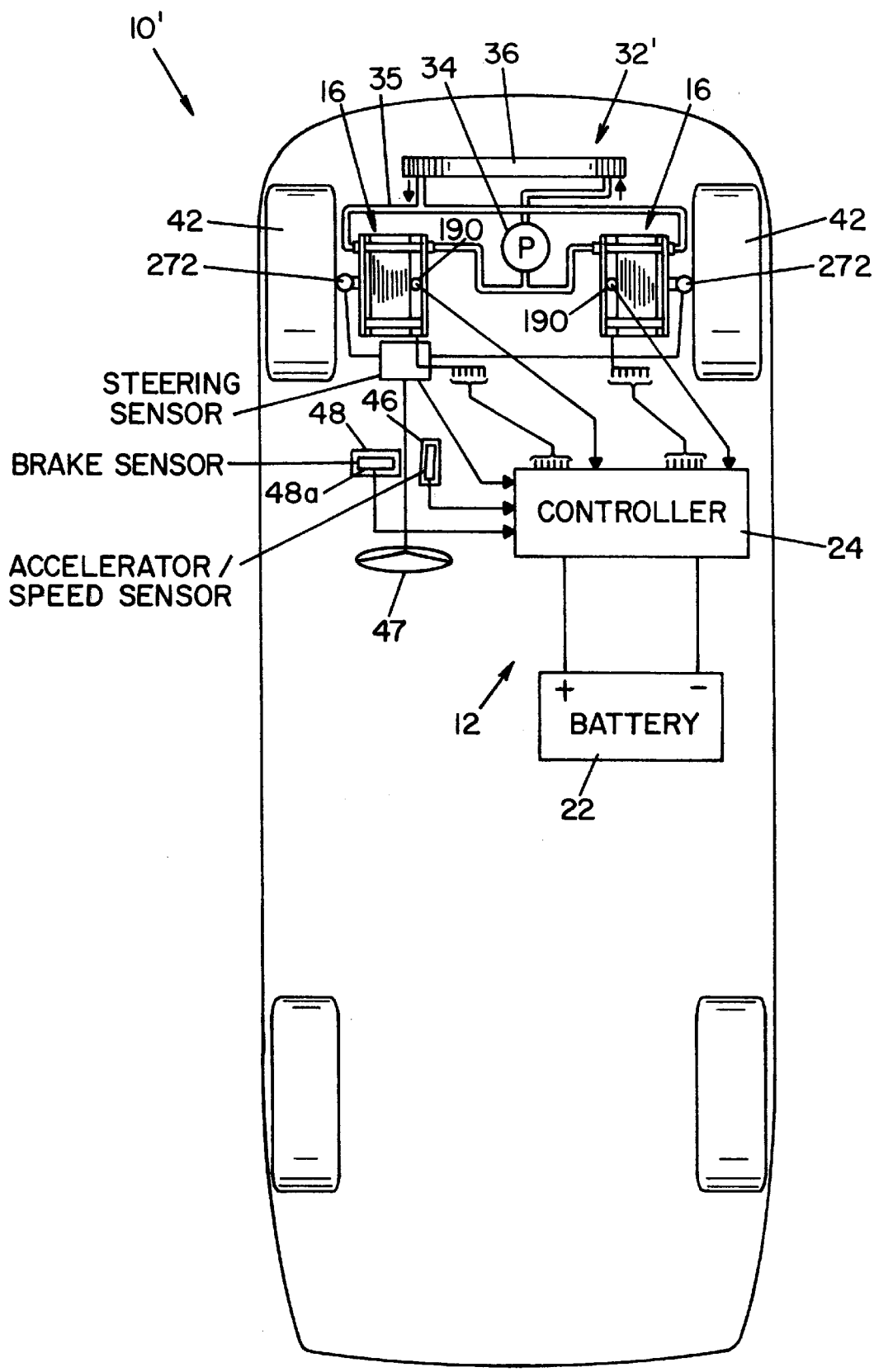
FIG. 2 is a view similar to FIG. 1, of a dual traction, front-motor drive electric vehicle illustrating an alternate embodiment of the present invention.

The invention has been described with reference to preferred embodiments. Modifications and alterations will occur to others upon a reading and understanding of the specification. For example, FIG. 2 shows a vehicle 10' illustrating an alternate embodiment of the present invention. (In FIG. 2, components that are the same as those of vehicle 10, as shown in FIG. 1, are identified with like reference numbers). Vehicle 10' is a front-wheel drive vehicle having a pair of drive wheels 42 that are also the steering or turning wheels for vehicle 10'. In vehicle 10', motors 16 are not part of an assembly, but are independent. Each motor 16 is mounted adjacent an associated drive wheel 42 to be driven. A universal joint 272 is provided between each motor 16 and its associated drive wheel 42 to allow drive wheel 42 to be driven by motor 16 and to turn at the same time. Vehicle 10' shows a split cooling system 32' wherein cooling fluid is directed through each motor 16 and the heated fluid is then directed back to radiator 36. The control of vehicle 10' by controller 24 is the same as that heretofore described with respect to vehicle 10. Vehicle 10' thus shows the versatility of motors 16 and its advantageous application in a number of different ways in an electric powered vehicle.

Figure 20:
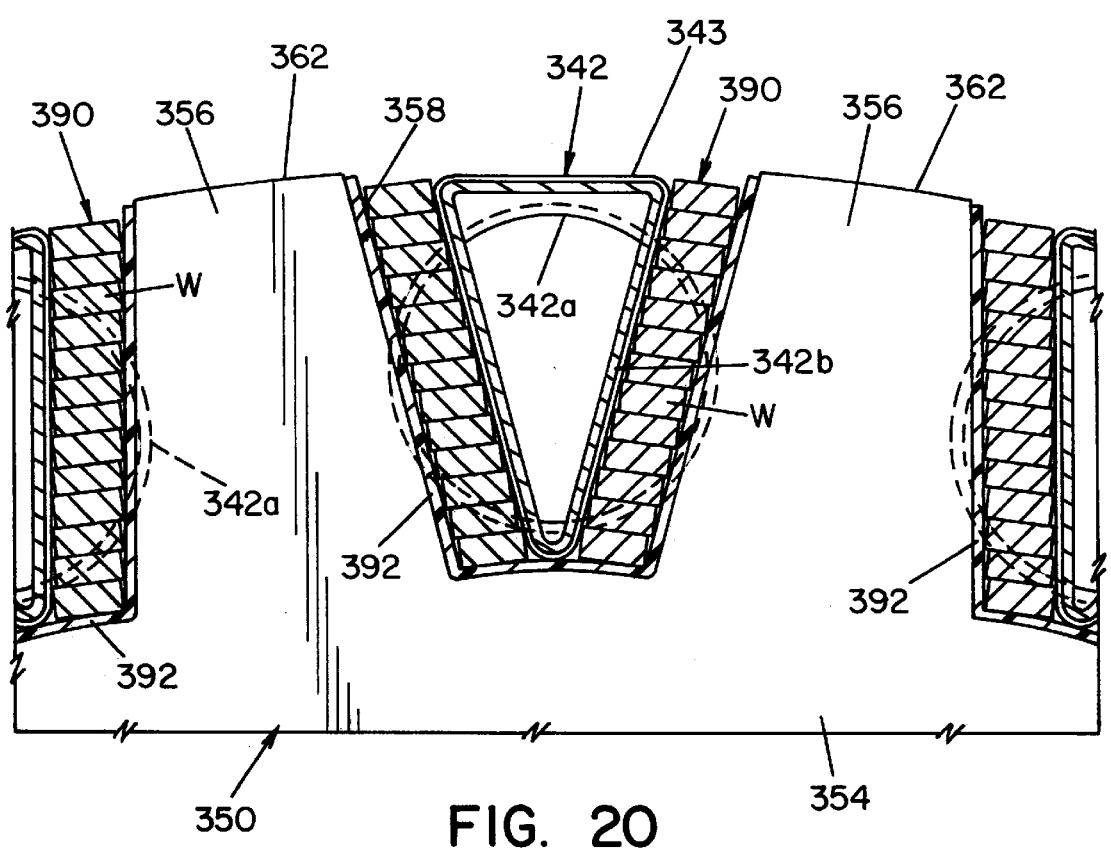
FIG. 20 is an enlarged cross-sectional view, similar to FIG. 9, showing an inner stator, conductor and cooling arrangement, illustrating an alternate embodiment of the present invention.

Referring now to FIG. 20, a stator assembly 350 illustrating an ultimate embodiment of the present invention is shown. FIG. 20 is similar to FIG. 9, but shows an inner stator assembly 350 having a central portion 354 with equally spaced, radially outwardly extending like stator poles 356. A gap 358 is defined between stator poles 356. Each stator pole 356 includes an outward facing stator pole face 362. Stator poles 356 are trapezoidal in shape and define a trapezoidal gap 358 therebetween. Pre-formed conductors 390 (similar to conductors 90 heretofore described) are provided for mounting onto stator pole 356. Conductors 390 are pre-formed of a wire "W" of rectangular cross-section, wherein the wire W is formed into a single layer to have an edge-wise wrap around an associated stator pole 356. A liner 392 is placed within gap 358 to insure electrical isolation between each conductor 390 and an associated stator pole 356. Liner 392 is typically formed of an insulating material, such as paper or plastic as is conventionally known. Liner 392 may be pre-formed or may be a powder coating deposited in gap 358.

A cooling tube 342 having an intermediate portion 342b of triangular cross-section, is provided to be disposed within the gap defined between adjacent conductors 390. Cooling tube 342 is preferably formed of a non-magnetic metal as an integral, single piece. In the embodiment shown, cooling tube 342 is formed from a thin wall, stainless steel, cylindrical tube wherein the intermediate portion 342b is formed into a triangular shape. The distal ends 342a of cooling tube 342 maintain a cylindrical shape as shown in phantom of FIG. 20. Intermediate section 342b of cooling tube 342 is coated with an insulating tape or a powder resin coating 343 to insure electrical isolation from conductors 390. As shown in FIG. 20, intermediate section 342b of cooling tube 342 is dimensioned so as to snuggly fit within the slot or gap defined between adjacent conductors 390. Any void or space between a cooling tube 342 and an adjacent conductor 390 is preferably filled with a thermally conductive material (not shown).

FIG. 20 thus shows an ultimate embodiment of an inner stator assembly 350 having single layer conductors 390 and a cooling tube 342 in contact therewith to cool stator assembly 350. The structure shown in FIG. 20 provides the same advantages with respect to cooling and power as previously described with respect to FIG. 9, and illustrates a similar construction of an inner stator assembly 350. Such an inner stator assembly 350 could be used as a hub with an outer rotor being mounted to, or being part of, a wheel to be driven.

These and other modifications will occur to others upon a reading of the specification. It is intended that all such modifications and alterations be included insofar as they come within the scope of the invention as claimed or the equivalents thereof.

Having described the invention, the following is claimed:

1. A fluid-cooled switched reluctance motor, comprising:

a stator having a plurality of evenly spaced, radially oriented, like stator poles that define a gap between adjacent stator poles, said stator poles having side walls dimensioned wherein adjacent side walls on adjacent stator poles are parallel;

windings wound about said stator poles, adjacent windings forming a slot of uniform cross-section therebetween;

a rotor element mounted for rotation relative to said stator, said rotor having a plurality of equally spaced, radially oriented like rotor poles;

an elongated cooling tube disposed within each of said slots between said windings, said cooling tube having a first end and a second end, and being dimensioned to essentially fill said slot between adjacent windings; and a first coolant chamber disposed at a first end of said stator, and a second coolant chamber disposed at a second end of said stator, said first coolant chamber connected to said first end of each of said cooling tubes, and said second coolant chamber connected to said second end of each of said cooling tubes, wherein each of said cooling tubes connects said first coolant chamber to said second coolant chamber.

2. A fluid-cooled switched reluctance motor as defined in claim 1, wherein said stator has 24 stator poles and said rotor has 16 rotor poles.

3. A fluid-cooled switched reluctance motor as defined in claim 2, wherein each of said stator poles has a stator pole face and each of said rotor poles has a rotor pole face, said stator pole face being approximately equal to said rotor pole face.

4. A fluid-cooled switched reluctance motor as defined in claim 3, wherein said stator is comprised of plurality of like laminations.

5. A fluid-cooled switched reluctance motor as defined in claim 4, wherein said laminations are welded together.

6. A fluid-cooled switched reluctance motor as defined in claim 5, wherein said switched reluctance motor is a three phase motor.

7. A fluid-cooled switched reluctance motor as defined in claim 4, wherein said windings are comprised of preformed conductors mounted onto said stator poles.

8. A fluid-cooled switched reluctance motor as defined in claim 7, wherein each of said conductors is comprised of a length of insulted rectangular copper wire that is wound into a coil.

9. A fluid-cooled switched reluctance motor as defined in claim 8, wherein said insulated, rectangular wire has a square cross-section.

10. A fluid-cooled switched reluctance motor as defined in claim 8, wherein said insulated, rectangular wire has a non-square cross-section and said wire is wrapped edgewise.

11. A fluid-cooled switched reluctance motor as defined in claim 1, wherein said cooling tube has cylindrical end portions and a flattened, generally rectangular intermediate portion.

12. A fluid-cooled switched reluctance motor as defined in claim 11, wherein said cooling tube is formed from a cylindrical stainless steel tubing.

13. A fluid-cooled switched reluctance motor as defined in claim 12, wherein said cooling tube includes fluid seals at the ends thereof to seal said tubes to said coolant chambers.

14. A fluid-cooled switched reluctance motor as defined in claim 13, further comprising end plates attached to distal ends of said motor, said end plates enclosing said stator and said rotor, and forming part of said coolant chambers.

15. A fluid-cooled switched reluctance motor as defined in claim 1, wherein said rotor element is comprised of a rotor body mounted onto a shaft section, said rotor body comprised of a plurality of like rotor laminations.

16. A fluid-cooled switched reluctance motor as defined in claim 15, wherein said rotor body is heat shrunk onto said shaft section.

17. A fluid-cooled switched reluctance motor as defined in claim 16, wherein said rotor body is comprised of a plurality of like rotor laminations formed of a ferromagnetic material.

18. A fluid-cooled switched reluctance motor as defined in claim 17, wherein said shaft section includes a hollow central portion.

19. A fluid-cooled switched reluctance motor as defined in claim 17, wherein said shaft section is comprised of a cylindrical tube formed of a low magnetic permeable material having end caps attached thereto.

20. A fluid-cooled switched reluctance motor as defined in claim 19, wherein said cylindrical tube is formed of stainless steel and said end caps are fastened to said tube by fasteners extending through said hollow central portion defined by said tube.

21. A motor assembly, comprised of:
a pair of side-by-side, in line motors, each of said motors being essentially identical to the other and, comprised of:
a stator having a plurality of evenly spaced, radially oriented, like stator poles that define a gap between adjacent stator poles, said stator poles having side walls dimensioned wherein adjacent side walls on adjacent stator poles are parallel;
windings wound about said stator poles, adjacent windings forming a slot of uniform cross-section therebetween;
a rotor element mounted for rotation relative to said stator, said rotor having a plurality of equally spaced, radially oriented like rotor poles;
a first coolant chamber disposed at a first end of said stator and a second coolant chamber disposed at a second end of said stator;
an elongated cooling tube disposed within each of said slots between said windings, said cooling tube having a first end connected to said first coolant chamber and a second end connected to said second coolant chamber, said cooling tube being dimensioned to essentially fill said slot between adjacent windings;
said motors being fixedly mounted to each other and said cooling tubes being connectable to a source of cooling fluid; and
a controller for controlling the operation of said motors, wherein each motor operates independently of the other.

22. A motor assembly as defined in claim 21, wherein said windings are comprised of pre-formed conductors mounted onto said stator poles.

23. A motor assembly as defined in claim 22, wherein each of said conductors is comprised of a length of insulated rectangular copper wire that is wound into a coil.

24. A motor assembly as defined in claim 23, wherein said insulated, rectangular wire has a square cross-section.

25. A motor assembly as defined in claim 23, wherein said insulated, rectangular wire has a non-square cross-section and said wire is wrapped edgewise.

26. A motor assembly as defined in claim 21, wherein said cooling tube has cylindrical end portions and a flattened, generally rectangular intermediate portion.

27. A motor assembly as defined in claim 26, wherein said cooling tube is formed from a cylindrical stainless steel tubing.

28. A motor assembly as defined in claim 21, wherein said switched reluctance motor is a three phase motor.

29. An electric vehicle, comprised of:
an electrical energy source;
a fluid-cooled switched reluctance motor for driving wheels on an electric vehicle, said motor comprising:
a stator having a plurality of evenly spaced, radially oriented, like stator poles that define a gap between adjacent stator poles, said stator poles having side walls dimensioned wherein adjacent side walls on adjacent stator poles are parallel;
windings wound about said stator poles, adjacent windings forming a slot of uniform cross-section therebetween;
a rotor element mounted for rotation relative to said stator, said rotor having a plurality of equally spaced, radially oriented like rotor poles;
a first coolant chamber disposed at a first end of said stator and a second coolant chamber disposed at a second end of said stator; and
an elongated cooling tube disposed within each of said slots between said windings, said cooling tube having a first end connected to said first coolant chamber and a second end connected to said second coolant chamber, said cooling tube being dimensioned to essentially fill said slot between adjacent windings;

a coolant system for circulating a coolant fluid through said cooling tubes of said motor producing a one directional flow of said coolant fluid through said motor;

a controller for controlling an energy transfer from said energy source to said motor.

30. An electric vehicle as defined in claim 29, wherein each of said stator poles has a stator pole face and each of said rotor poles has a rotor pole face, said stator pole face being approximately equal to said rotor pole face.

31. An electric vehicle as defined in claim 30, wherein said stator is comprised of plurality of like laminations.

32. An electric vehicle as defined in claim 31, wherein said windings are comprised of preformed conductors mounted onto said stator poles.

33. An electric vehicle as defined in claim 32, wherein each of said conductors is comprised of a length of insulted rectangular copper wire that is wound into a coil.

34. An electric vehicle as defined in claim 33, wherein said insulated, rectangular wire has a square cross-section.

35. An electric vehicle as defined in claim 33, wherein said insulated, rectangular wire has a non-square cross-section and said wire is wrapped edgewise.

36. An electric vehicle as defined in claim 33, wherein said cooling tube has cylindrical end portions and a flattened, generally rectangular intermediate portion.

37. An electric vehicle as defined in claim 36, wherein said cooling tube is formed from a cylindrical stainless steel tubing.

38. An electric vehicle as defined in claim 37, wherein said cooling tube includes fluid seals at the ends thereof to seal said tubes to said coolant chambers.

39. An electric vehicle as defined in claim 31, wherein said switched reluctance motor is a three phase motor.

40. In a switch reluctance motor having a stator comprised of a plurality of equally spaced, radially oriented like stator poles wherein stator gaps are formed between adjacent stator poles along the length of said stator, a conductor/cooling assembly comprised of:

a pre-formed conductor formed from a single layer of insulated rectangular wire that is formed into a coil, said coil shaped to mount onto a stator pole in mating fashion, said conductor being positioned within said stator gap, wherein adjacent conductors define an opening or slot in said stator gap; and a cooling tube having a cooling passage therethrough disposed within said stator gap between conductors on adjacent stator poles, said cooling tube formed from a cylindrical, non-magnetic thin-walled tube to have cylindrical distal ends and an intermediate section formed into a shape conforming to a shape of said opening between said adjacent conductors, said intermediate portion essentially filling said opening along the length of said stator gap.

41. A switched reluctance motor as defined in claim 40, wherein said cooling tube is an integral component formed from a single cylindrical tube.

42. A switched reluctance motor as defined in claim 41, wherein said cooling tube is formed of metal.

43. A switched reluctance motor as defined in claim 42, wherein said cooling tube is formed of metal having low magnetic permeability.

44. A switched reluctance motor as defined in claim 43, wherein said cooling tube is stainless steel.

45. A switched reluctance motor as defined in claim 40, wherein said intermediate section of said cooling tube includes an insulating coating.

46. A switched reluctance motor as defined in claim 45, wherein said insulating coating is a tape wrapped onto said intermediate section.

47. A switched reluctance motor as defined in claim 45, wherein said insulating coating is a powder resin coating.

48. A switched reluctance motor as defined in claim 45, wherein said cooling tube is in physical contact with said conductors.

49. A switched reluctance motor as defined in claim 40, wherein said stator poles are trapezoidal in shape.

50. A switched reluctance motor as defined in claim 49, wherein said conductors are trapezoidal in shape and said opening between said conductors is generally rectangular in shape.

51. A switched reluctance motor as defined in claim 40, wherein said insulated, rectangular wire has a square cross-section.

52. A switched reluctance motor as defined in claim 40, wherein said insulated, rectangular wire has a non-square cross-section and said wire is wrapped edgewise.

* * * * *